No. 854,165. PATENTED MAY 21, 1907.
N. B. HODGE.
PLANTING MECHANISM.
APPLICATION FILED SEPT. 7, 1906.
2 SHEETS—SHEET 1.
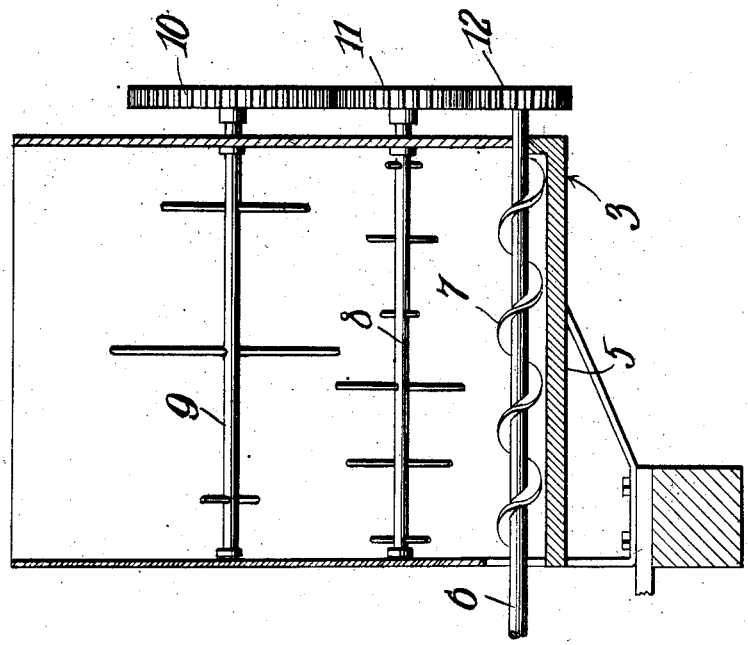
Neely B. Hodge,
INVENTOR
WITNESSES:
By
ATTORNEYS No. 854,165. PATENTED MAY 21, 1907.
N. B. HODGE.
PLANTING MECHANISM.
APPLICATION FILED SEPT. 7, 1906.
2 SHEETS—SHEET 2.
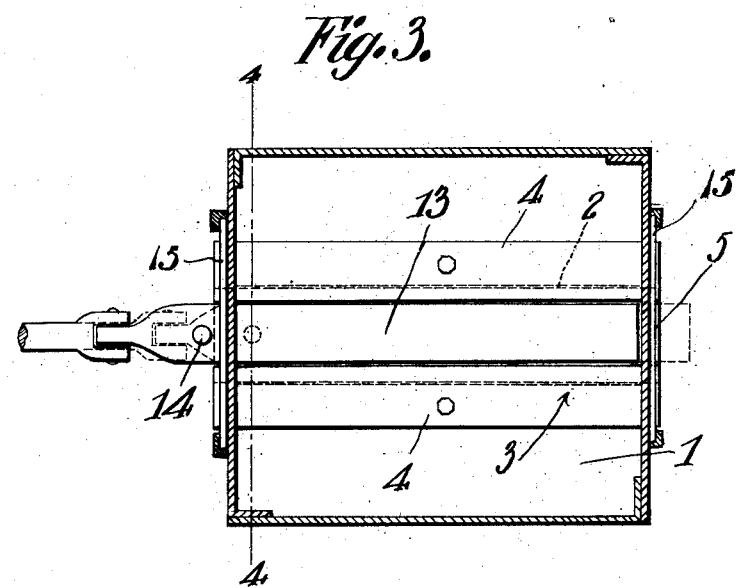
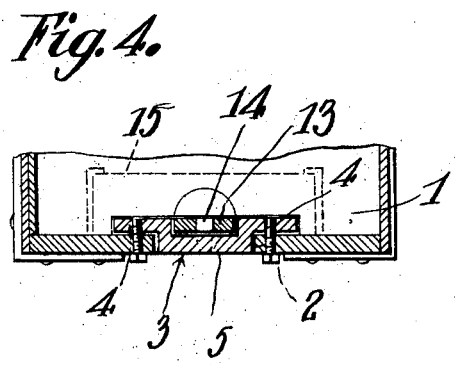
WITNESSES:
Neely. B. Hodge,
INVENTOR
By
ATTORNEYS

UNITED STATES PATENT OFFICE.

NEELY B. HODGE, OF DALLAS, TEXAS.

PLANTING MECHANISM.

No. 854,165.　　　Specification of Letters Patent.　　　Patented May 21, 1907.

Application filed September 7, 1906. Serial No. 333,678.

*To all whom it may concern:*

Be it known that I, NEELY B. HODGE, a citizen of the United States, residing at Dallas, in the county of Dallas and State of Texas, have invented a new and useful Planting Mechanism, of which the following is a specification.

This invention has relation to planting mechanisms and it consists in the novel construction and arrangement of its parts as hereinafter shown and described.

The object of the invention is to provide a hopper which may be used upon a planter for dropping seed of various sizes and shapes. It is especially adapted for planting either cotton or corn and by the substitution of simple attachments may be used to advantage in either said capacity. For planting corn, a sliding dropper is used and for planting cotton a rotating worm is employed.

In the drawings:—Figure 1 is a longitudinal sectional view of the hopper fitted with a cotton dropper. Fig. 2 is a transverse sectional view of the same. Fig. 3 is a horizontal sectional view of the hopper fitted with a corn dropper. Fig. 4 is a transverse sectional view of the lower position of the same.

The bottom of the hopper 1 is provided with the longitudinally extending opening 2. The false bottom 3 is provided with the laterally extending edges or wings 4 which rest upon the upper surface of the bottom of the hopper 1 and the intermediate portion 5 which enters the said opening 2 and bears against the edges thereof and prevents lateral movement of the said false bottom 3. The rear edge of the false bottom 3 constitutes a seed delivery end of the said bottom. The said bottom 3 extends through the front and rear ends of the hopper 1. The worm shaft 6 is journaled in the front and rear sides of the said hopper 1 and the worm 7 co-operates with the trough of the intermediate portion 5 of the false bottom 3. The stirrer shaft 8 is located horizontally above the worm shaft 6 and the stirrer shaft 9 is located horizontally above the said shaft 8. The shafts 6, 8 and 9 are vertically in alinement with each other. The gear wheel 10 is attached to the end of the shaft 9 and meshes with the gear wheel 11 which is attached to the end of the shaft 8 and which in turn meshes with the gear wheel 12 attached to the end of the worm shaft 6. Any suitable means (not shown) may be provided for rotating the worm shaft 6 and it is obvious that through the chain of gears 12, 11 and 10 that the stirrer shafts will be rotated, one in the same direction as the worm shaft 6 and the other in the opposite direction.

In the form of the invention as shown in Figs. 3 and 4 the slide 13 is substituted for the worm 7. Said slide is provided with the seed perforation 14 and a suitable means (not shown) is provided for reciprocating the said slide 13. The slide is used for dropping corn or other smooth seed. The perforation is reciprocated back and forth from the interior of the hopper 1 to the delivery edge of the false bottom 3 at which point the seed falls from the perforation 14.

In the form of the invention as illustrated in Figs. 1 and 2 the worm 7 is used for passing cotton seed or other lint bearing seed from the hopper. The said seed will follow the worm to the said end of the false bottom 3 at which point it falls to the ground. The front and rear sides of the hopper are provided with the vertically sliding gates 15 which are adapted to close the openings made for the shafts as illustrated in the figures for in planting some seed, it is desirable that the said shafts be removed from the hopper.

Having described my invention, what I claim as new and desire to secure by Letters Patent is:—

1. A seed dropping hopper comprising a body having at its bottom an opening extending from the front to the rear side of the body, a false bottom located in said opening and having laterally disposed wings that rest upon the upper surface of the bottom of the body, and an intermediate depending portion that fits within the opening in the bottom of the body and in its upper side a trough located in its longitudinal axis, and a moving seed separator located in the hopper and operating in said trough.

2. A hopper comprising a body having in its bottom an opening which extends from its front to its rear side, a false bottom located in said opening and having a seed delivery end, and a trough disposed along its central longitudinal axis, a seed separator operating within said trough to convey the seed from the hopper to the delivery end of the false bottom, stirrers mounted for rotation in the upper portion of the hopper, one stirrer rotating in one direction and the other stirrer rotating in the opposite direction.

In testimony that I claim the foregoing as my own, I have hereto affixed my signature in the presence of two witnesses:

NEELY B. HODGE.

Witnesses:
 JOHN CHRISTMAN,
 C. C. ROBERTSON.